M. J. CONDELL, H. C. BECK & F. H. DANNENBERG.
MEAT HANGER.
APPLICATION FILED DEC. 7, 1908.
940,924. Patented Nov. 23, 1909.
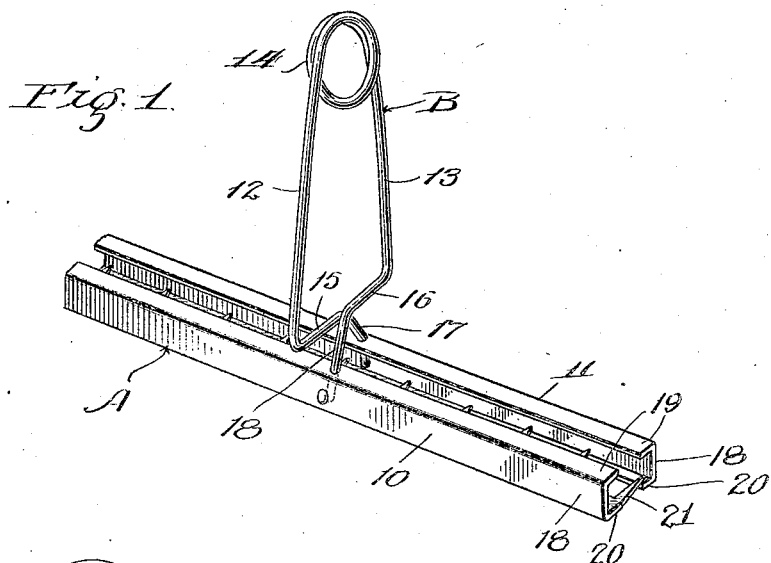
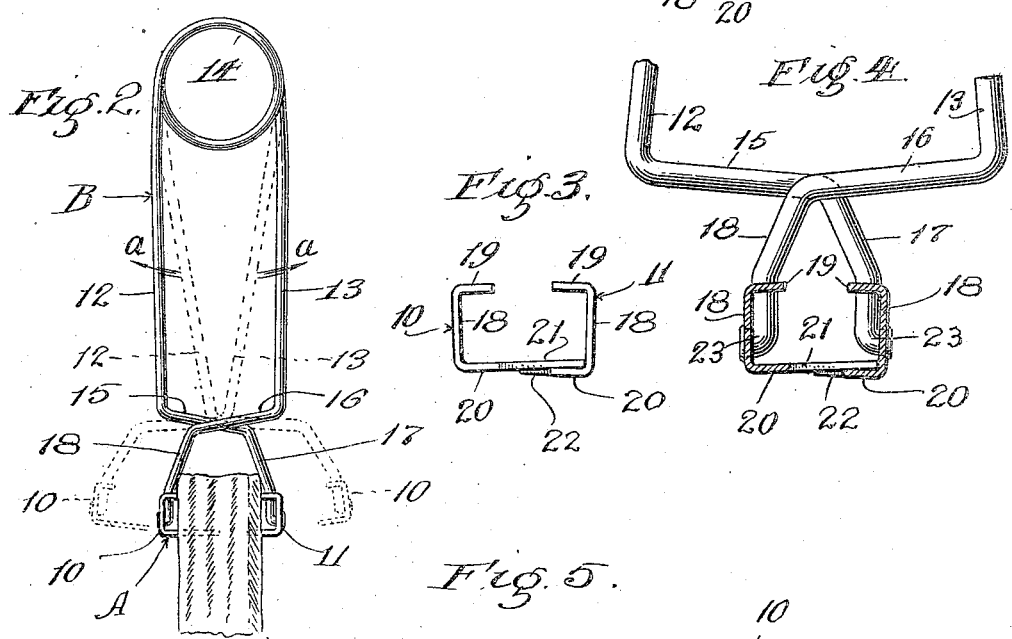
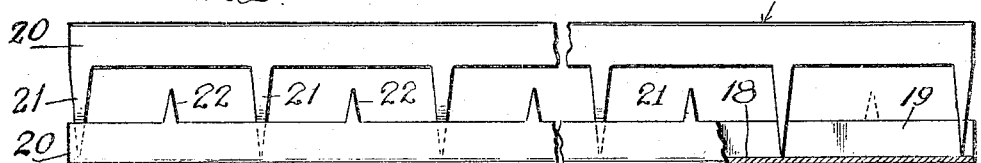

UNITED STATES PATENT OFFICE.

MILLAR J. CONDELL, HENRY C. BECK, AND FREDERICK H. DANNENBERG, OF CHICAGO, ILLINOIS; SAID DANNENBERG ASSIGNOR TO SAID CONDELL AND SAID BECK.

MEAT-HANGER.

940,924.  Specification of Letters Patent.  Patented Nov. 23, 1909.

Application filed December 7, 1908. Serial No. 466,249.

*To all whom it may concern:*

Be it known that we, MILLAR J. CONDELL, HENRY C. BECK, and FREDERICK H. DANNENBERG, citizens of the United States, residents of Chicago, in the county of Cook and State of Illinois, have invented certain new and useful Improvements in Meat-Hangers, of which the following is a full, clear, and exact description.

Our invention relates to improvements in meat hangers, and the object thereof is to provide an improved device for supporting meat, such as bacon and the like, during the process of curing the same. The means for supporting the meat during the curing process is usually in the form of a piece of rope or cord which is passed through one corner of the bacon, or often a pin or pins are thrust through the bacon for supporting it. It is our purpose to provide a simple and efficient device which may be readily applied to the meat or removed therefrom, and which is arranged to support the meat wholly along one edge so that in shrinking it will be prevented from warping out of shape.

To such ends this invention consists in certain novel features of construction and arrangement, a description of which will be found in the following specification, and the essential features of which will be more definitely pointed out in the claims appended hereto.

The invention is clearly illustrated in the drawings furnished herewith in which—

Figure 1 is a perspective view of a complete hanger embodying our improvements, Fig. 2 is an edge view thereof, showing the same in the act of supporting a side of bacon, Fig. 3 is a detail end view of the gripping jaws, Fig. 4 is a vertical cross section through the device, and Fig. 5 is an underplan view with certain portions broken away.

In these drawings A, is the gripper and B, the handle or supporting device.

10, 11, represent the gripping jaws of the gripper which jaws are adapted to be secured upon the meat which is to be supported by the hanger. These jaws are supported by the handle B, the two arms 12, 13, of which are preferably joined at their upper ends in any suitable manner, so as to provide a loop from which the entire device may be supported. As shown in the drawings, the upper ends of the arms are bent around to form a coiled spring-like arrangement 14, the tension of which is arranged to swing the arms in the direction indicated by the arrows a, in Fig. 2. The lower ends of the arms are bent approximately at right angles to the main portions of the arms and cross each other; they are then bent downward at 17, 18, and the lower ends secured upon the gripping jaws 10, 11. The tension of the spring upon the arms operates to press the gripping jaws together, and this arises from the fact that in the construction shown the lower ends of the arms cross each other and each arm is attached to the gripping jaw which is arranged on the side opposite the arm.

The gripping jaws are preferably channel shaped in form having sides 18, upper flanges 19, and lower flanges 20. Gripping teeth 21, 22, are provided upon certain of the flanges of the gripping jaws and in the preferred form the teeth 21, are considerably longer than the teeth 22, the teeth 21, being arranged to enter the channel between the flanges of the gripping jaw 11, and strike the end wall 18, thereof whenever the jaws are closed. This arrangement and inclosure of the teeth minimizes the danger of injury to the hands from the teeth in handling the device. The teeth 21, are suitably spaced apart and the teeth 22, are shown as arranged intermediate the teeth 21, although it is to be observed that this particular arrangement of gripping edges is not essential to our invention, broadly speaking, as any suitable form of serrations or gripping edges may be employed.

The handle is preferably secured to the gripping jaws by extending the lower ends 17, 18, of the arms 12, 13, through holes in the flanges 19, bending the terminal ends 23, outward, passing them through holes in the sides 18, and heading them upon the outer faces thereof. This forms a simple arrangement for connecting the handle to the gripper and one in which the parts are not liable to become detached from each other, in the rough usage to which devices of this class are apt to be put.

In operation the handle is grasped in the hand, the two arms 12, 13, pressed together to separate the jaws and the jaws then slipped over the edge of the side of bacon or other meat which is to be supported. If the handle is now released the spring will close the jaws upon the bacon and cause the teeth to grip the same. In clamping the device upon the bacon, the shorter teeth should be placed on the hide side of the bacon, thus allowing the longer teeth to enter the fleshy part thereof. The device may now be hung upon a hook or other support, and the bacon will be supported in an even and upright manner. As it shrinks during the curing process, it will naturally shrink along the gripping jaws in a substantially straight line, instead of warping and getting out of shape as it does when it is supported from one corner. The channel shaped gripping jaws provide passage ways through which the smoke or gases may pass so as to affect that portion of the bacon which is located between the upper and lower flanges of the jaws, and in this manner every portion of the bacon will be affected by the curing medium. It should be noticed that the teeth are flat horizontally. This arrangement prevents the teeth from tearing through the bacon when the bacon is in a raw state and is supported merely by the teeth. It should be noticed that by reason of the peculiar arrangement of the arms any downward pull upon the gripping jaws causes them to swing toward each other and thus the weight of the bacon tends to crowd the jaws together. There is therefore no danger of the jaws releasing their hold upon the bacon while the latter is being supported thereby.

We are aware that various alterations and modifications of the particular construction shown and described are possible without departing from the spirit of our invention, and we do not therefore desire to limit ourselves except as may be necessitated by the prior state of the art.

We claim as new and desire to secure by Letters Patent:

1. In a meat hanger, the combination of two jaws, each having a flange which extends toward the corresponding flange upon the opposite jaw; opposing gripping teeth formed upon said flanges, the teeth on one flange lying between the teeth on the opposite flange and being considerably longer than the teeth on said opposite flange, and a support for said jaws comprising arms which are secured to the jaws, and cross each other above the jaws and have a spring connection between their upper ends which is arranged to crowd the jaws toward each other.

2. In a meat hanger, the combination of two flanged channel shaped gripping jaws, gripping teeth upon one of the flanges of each jaw, the teeth upon one flange lying between the teeth upon the corresponding flange of the opposite jaw, and an arm extending up from each jaw, and crossing the other arm above the jaws, said arms joining each other at their upper ends in the form of a coiled spring whose tension is to crowd the jaws toward each other.

3. In a meat hanger, the combination of two channel shaped gripping jaws, the flanges of which are formed with integral, oppositely pointing, flat teeth, arms extending up therefrom and crossing each other, and a spring connection between said arms for crowding the jaws together.

4. In a meat hanger, the combination of two gripping jaws, having upper and lower flanges, one of said lower flanges having long gripping teeth and the opposing lower flange having short gripping teeth adapted for engagement with the object to be supported, an arm extending from each jaw and crossing the opposite arm at a point intermediate its ends, and a spring connection at the upper ends of the arms for crowding the jaws upon each other.

In witness whereof we have hereunto subscribed our names at Chicago, Illinois, this 4th day of December A. D. 1908.

MILLAR J. CONDELL.
HENRY C. BECK.
FREDERICK H. DANNENBERG.

Witnesses:
  CHARLES O. SHERVEY,
  FANNIE F. RICHARDS.